(12) United States Patent
Brütt et al.

(10) Patent No.: US 11,827,193 B2
(45) Date of Patent: Nov. 28, 2023

(54) CONTROL MODULE OF A TOW VEHICLE FOR CONTROLLING A PNEUMATIC BRAKING SYSTEM OF A TRAILER VEHICLE

(71) Applicant: ZF CV Systems Global GmbH, Bern (CH)

(72) Inventors: Mirko Brütt, Springe (DE); Michael Haverkamp, Hannover (DE)

(73) Assignee: ZF CV Systems Global GmbH, Bern (CH)

( * ) Notice: Subject to any disclaimer, the term of this patent is extended or adjusted under 35 U.S.C. 154(b) by 130 days.

(21) Appl. No.: 17/215,019

(22) Filed: Mar. 29, 2021

(65) Prior Publication Data

US 2021/0300311 A1  Sep. 30, 2021

(30) Foreign Application Priority Data

Mar. 31, 2020 (DE) ...................... 10 2020 108 947.3

(51) Int. Cl.
*B60T 13/68* (2006.01)
*B60T 7/20* (2006.01)
*B60T 13/26* (2006.01)

(52) U.S. Cl.
CPC .............. *B60T 13/683* (2013.01); *B60T 7/20* (2013.01); *B60T 13/263* (2013.01)

(58) Field of Classification Search
CPC .......... B60T 7/20; B60T 13/263; B60T 13/38; B60T 13/68; B60T 13/581; B60T 13/662; B60T 13/686; B60T 8/171; B60T 8/1708; B60T 11/108; B60T 15/027; B60T 15/028; B60T 15/18; B60T 15/20; B60T 15/24; B60T 15/181; B60T 15/203;
(Continued)

(56) References Cited

U.S. PATENT DOCUMENTS

2020/0148180 A1* 5/2020 Van Thiel ............. B60T 13/263

FOREIGN PATENT DOCUMENTS

DE         19857393 A1    1/2000
DE      102008048207 A1   6/2010
(Continued)

OTHER PUBLICATIONS

Englished machined translation of WO-2018172333 (Description only), Sep. 2018.*

*Primary Examiner* — Robert A. Siconolfi
*Assistant Examiner* — San M Aung
(74) *Attorney, Agent, or Firm* — Dickinson Wright PLLC

(57) ABSTRACT

A trailer control module (94) of a pressure-medium operated braking system of a tow vehicle has a valve assembly for controlling a pneumatic braking system of a trailer vehicle The valve assembly includes the following: an electronically controlled trailer control valve (6) which contains a pneumatically controlled relay valve (18) with an inverted control input (34); a pressure-medium controlled backup valve (8) which contains a pressure-medium controlled relay valve (54); and at least one electronically controlled parking brake valve (68, 70), via which the relay valve (18) of the trailer control valve (6) can be actuated pneumatically at its inverted control input (34). In addition, a coupling device (98) is present, by which the parking brakes of the tow vehicle can also be operated via the parking brake valve (68, 70).

11 Claims, 8 Drawing Sheets

(58) Field of Classification Search
CPC ............... B60T 15/243; B60T 2260/04; B60T 2270/402; B60T 2270/413; F16K 31/06; G05D 16/2013
USPC ............................................................ 303/5
See application file for complete search history.

(56) References Cited

FOREIGN PATENT DOCUMENTS

| | | | |
|---|---|---|---|
| DE | 102009059816 B3 | 4/2011 | |
| DE | 102011053707 A1 | 3/2013 | |
| DE | 102014100069 A1 | 7/2015 | |
| DE | 102014002614 A1 | 8/2015 | |
| DE | 102014118943 A1 | 10/2015 | |
| DE | 102015116317 A1 | 3/2017 | |
| DE | 102018104143 A1 | 8/2019 | |
| DE | 102019100869 A1 | 7/2020 | |
| WO | WO-2018172333 A1 * | 9/2018 | ............ B60T 13/263 |
| WO | WO-2019068393 A1 * | 4/2019 | ............ B60T 13/26 |
| WO | WO-2020025225 A1 * | 2/2020 | ............ B60T 13/263 |

* cited by examiner

CONTROL MODULE OF A TOW VEHICLE FOR CONTROLLING A PNEUMATIC BRAKING SYSTEM OF A TRAILER VEHICLE

TECHNICAL FIELD

The invention concerns a trailer control module of a pressure-medium operated braking system of a tow vehicle, with a valve assembly for controlling a pneumatic braking system of a trailer vehicle. The valve assembly comprises the following: an electronically controlled trailer control valve which contains a pneumatically controlled relay valve with an inverted control input, a pressure-medium controlled backup valve which contains a pressure-medium controlled relay valve, and at least one electronically controlled parking brake valve, via which the relay valve of the trailer control valve can be pneumatically actuated at its inverted control input.

BACKGROUND

Modern tow vehicles such as trucks and semitrailers, which are mainly intended for travel on asphalted roads and highways, usually have a compressed air operated braking system with an electronic control unit. In contrast, modern tow vehicles such as tractors, which are designed for use away from asphalted roads and streets, are frequently equipped with hydraulic braking systems with electronic control. The braking systems of both types of vehicle usually have a valve assembly for controlling a pneumatic braking system of a couplable trailer vehicle. Such a valve assembly comprises an electronically controlled trailer control valve and a pressure-medium controlled backup valve. It may however also be provided with at least one electronically controlled parking brake valve.

In normal operation, in the trailer control valve, a reservoir pressure produced by a compressor and prepared in a compressed air supply system is conducted to a "reservoir" coupling head (red) of the tow vehicle, and depending on an electronic brake value signal, via a control pressure set via an inlet magnetic valve and an outlet magnetic valve, a corresponding brake control pressure is set in a pressure-controlled relay valve of the trailer control valve. This brake control pressure is conducted to the "brake" coupling head (yellow) of the tow vehicle. On failure of the electronic control system or in the absence of the electronic brake value signal, the electronically controlled trailer control valve is deactivated by the switching of a redundancy valve, and a brake control pressure for the trailer vehicle is set in the pressure-controlled relay valve of the backup valve via a brake pressure taken from a brake line of the tow vehicle, and this is conducted to the "brake" coupling head (yellow). So the function of the service brakes of the trailer vehicle is guaranteed even on failure of the electronic controller of the trailer control valve.

DE 10 2014 002 614 A1 describes several embodiments of such a valve assembly of a hydraulically braked tow vehicle for controlling the brake pressure of a pneumatically braked trailer vehicle, which comprise an electronically controlled trailer control valve and a hydraulically controlled backup valve for input of the brake control pressure conducted to the "brake" coupling head. The trailer control valve and backup valve are here configured as separate valve units which are connected together via pneumatic lines and to an electronic control unit via electrical control lines.

In contrast, the not yet published DE 10 2019 100 869 A1 describes an embodiment of a valve assembly of a hydraulically braked tow vehicle for controlling the brake pressure of a pneumatically braked trailer vehicle, in which the valves of the trailer control valve and the backup valve are combined in a single housing in a trailer control module. This integrated arrangement of the trailer control valve and backup valve in a trailer control module simplifies installation in the tow vehicle concerned and avoids possible installation errors.

Tow vehicles with pressure-medium operated brake systems have totally separate wheel brake cylinders for operation of the wheel brakes, firstly in the function as service brakes and secondly in the function as parking or holding brakes. For operating the service brakes of a tow vehicle, active wheel brake cylinders such as diaphragm or piston brake cylinders are provided, which are loaded with a brake pressure input via a foot brake valve. In contrast, for operating the parking or holding brakes of a tow vehicle, passive wheel brake cylinders are provided in the form of spring accumulator brake cylinders, which are released by the input of a pressure medium and applied, i.e. brought into the closed position, by the discharge of the pressure medium. The wheel brake cylinders of the service brakes and of the parking or holding brakes may act on separate mechanical brake elements or, if combined for example in combination brake cylinders, be actively connected to the same mechanical brake elements.

Trailer vehicles with pneumatic brake systems however, in particular if intended for use in agriculture and forestry, are usually only equipped with active wheel brake cylinders such as diaphragm or piston brake cylinders, which are air-filled in both the service brake function and the parking brake function. While the wheel brake cylinders of a trailer vehicle are operated in the service brake function, in the trailer control valve of the tow vehicle, via the control pressure present at a direct control input of the relay valve and conducted to the "brake" coupling head (yellow), the wheel brake cylinders are operated in the parking brake function, in the trailer control valve of the tow vehicle, with a pressureless direct control input via the control pressure present at an inverted control input of the relay valve.

When the inverted control input is pressureless, the relay valve of the trailer control valve outputs the maximum pressure (reservoir pressure) and conducts this on to the "brake" coupling head (yellow), whereby the wheel brake cylinders of the trailer vehicle are loaded with maximum air pressure via the trailer brake valve there and hence the wheel brakes are operated. When the inverted control input is loaded with maximum pressure (reservoir pressure), the "brake" coupling head is purged via the relay valve of the trailer control valve, whereby the wheel brake cylinders of the trailer vehicle are purged via the trailer brake valve there and hence the wheel brakes released.

In the case of a vehicle train of the type considered here, until now, the parking brakes of the tow vehicle and the wheel brakes of the trailer vehicle are applied and released by the parking brake function via a manually operable handbrake valve arranged in the driver's cab of the tow vehicle. By means of this handbrake valve, the spring accumulator brake cylinders of the tow vehicle and the inverted control input at the relay valve of the trailer control vehicle are air-filled and purged directly.

However, embodiments of brake systems of vehicle trains are known in which the parking brakes of the tow vehicle and the wheel brakes of the trailer vehicle are applied and released in the parking brake function automatically by at least one magnetic switching valve, which is operated, for example, in a tow vehicle with automatic transmission, depending on the position of a gear selector lever. In this way, the parking brakes of the tow vehicle and the wheel brakes of the trailer vehicle are applied automatically when the vehicle train is stationary and the gear selector lever is moved to the "P" parked position.

A corresponding braking system of a vehicle train is known for example from DE 10 2018 104 143 A1. In this valve assembly for controlling the pneumatic braking system of a trailer vehicle, a parking brake module is provided with two parallel-connected parking brake valves and a change-over valve arranged on the outlet side. The two parking brake valves are configured as 3/2-way magnetic switching valves and can be switched independently of each other via separate switching units of an electronic control unit. Via the change-over valve, the outlets of the two parking brake valves are connected to the inverted control input at the relay valve of the trailer control valve. In the non-activated i.e. non-energized state of both parking brake valves, the inverted control input of the relay valve is switched to be pressureless, which leads to application or closure of the wheel brakes of the trailer vehicle in the parking brake function. On actuation, i.e. switching of one of the two parking brake valves, the inverted control input of the trailer control valve is loaded with reservoir pressure from a pressure-carrying supply line, which leads to release of the wheel brakes of the trailer vehicle. The parking brakes of the tow vehicle are however still actuated manually via a handbrake valve, or automatically via a further magnetic switching valve.

SUMMARY

The object of the present invention is to provide a trailer control module of a pressure-medium operated braking system of a tow vehicle, with a valve assembly for controlling a pneumatic braking system of a trailer vehicle, of the type cited initially in which the function scope is extended to include actuation of the parking brakes of the tow vehicle with minimum possible cost.

Accordingly, the invention concerns a trailer control module of a pressure-medium operated braking system of a tow vehicle, with a valve assembly for controlling a pneumatic braking system of a trailer vehicle. The valve assembly comprises the following: an electronically controlled trailer control valve which contains a pneumatically controlled relay valve with an inverted control input, a pressure-medium controlled backup valve which contains a pressure-medium controlled relay valve, and at least one electronically controlled parking brake valve, via which the relay valve of the trailer control valve can be actuated pneumatically at its inverted control input.

To achieve the object specified, in this trailer control module it is provided that in addition, a coupling device is present, by which the parking brakes of the tow vehicle can also be operated via the parking brake valve.

By the arrangement of a coupling device in the valve assembly of the trailer control module, not only the wheel brakes of the trailer vehicle but also the parking brakes of the tow vehicle can be operated via the parking brake valve. In this way, a handbrake valve in the driver's cab of the tow vehicle and/or an external magnetic switching valve for automatic actuation of the parking brakes of the tow vehicle may be omitted and the associated cost saved.

With respect to the coupling device, it is preferably provided that this comprises a pneumatically controllable coupling valve with a control input, that the control input of the coupling valve is connected via a connecting line to the outlet of the parking brake valve or to the outlet of a change-over valve downstream of the outlet of the parking brake valve, and that the parking brake cylinders of the tow vehicle can be connected via the coupling valve selectively to a pressure-medium source or to a pressure-medium sink. In this way, the parking brakes of the tow vehicle can be released and applied in synchrony with the wheel brakes of the trailer vehicle.

The coupling valve is preferably configured as a pneumatically pressure-controlled 3/2-way switching valve with one outlet. A brake line leading to the parking brake cylinders of the tow vehicle is connected to the outlet of the coupling valve, wherein the brake line is connected, when the coupling valve is not carrying control pressure, at an inlet of the brake line to the pressure-medium sink, and when the coupling valve is carrying control pressure, at the inlet of the brake line to the pressure-medium source.

With a hydraulic braking system of the tow vehicle, the parking brake cylinders of the tow vehicle can be connected via the coupling valve selectively to a hydraulic supply line connected to an oil pump or to a pressureless return line leading to a collection tank.

With a pneumatic braking system of the tow vehicle, the parking brake cylinders of the tow vehicle can be connected via the coupling valve selectively to a pneumatic reservoir line connected to a compressed air supply system or to a purge outlet leading to the environment.

For performance of a test function aiding a driver to check whether, on parking of a vehicle train, the parking brakes of the tow vehicle are sufficient to hold the vehicle train safely in the parked position, the coupling device advantageously also has a test valve via which the control input of the coupling valve can be connected selectively to the outlet of the parking brake valve or to the outlet of the change-over valve, or can be purged.

The test valve is preferably configured as a 3/2-way magnetic switching valve with one outlet, and arranged in a connecting line leading from the outlet of the parking brake valve or the outlet of the change-over valve to the control input of the coupling valve. The outlet of the test valve is connected to the control input of the coupling valve. The outlet of the test valve in its non-energized state is connected to a purge outlet. The outlet of the test valve in its energized state is connected to the outlet of the parking brake valve or to the outlet of the downstream change-over valve. On actuation i.e. energizing of the test valve, the parking brake cylinders of the tow vehicle are switched to be pressureless even when the inverted control pressure input of the trailer control valve carries pressure, and thus the wheel brakes of the trailer vehicle are released and the parking brakes of the tow vehicle are applied, whereby the test function can be performed.

With a pneumatic braking system of the tow vehicle, in an alternative embodiment, the coupling device may have only one connecting line, via which a brake line leading to the parking brake cylinders of the tow vehicle can be connected to the outlet of the parking brake valve or to the outlet of a change-over valve downstream thereof. The parking brake cylinders of the tow vehicle are then air-filled and purged directly via the parking brake valve and in some cases a change-over valve arranged downstream thereof, which requires correspondingly large opening cross-sections of the valves and large cross-sections of the lines arranged between these and the brake line.

For performance of the above-mentioned test function, this coupling device preferably also has a test valve, via which the brake line can be connected selectively to the outlet of the parking brake valve or to the outlet of the change-over valve, or can be purged.

The test valve is preferably configured as a 3/2-way magnetic switching valve with one outlet and is arranged between the connecting line and the brake line of the tow vehicle. The outlet of the test valve is connected to the brake line of the tow vehicle. It is furthermore provided that the outlet of the test valve, connected to the brake line of the tow vehicle, in its non-energized state is connected to a purge outlet, and the outlet of the test valve in its energized state is connected to the connecting line. On operation, i.e. when the test valve is energized, the parking brake cylinders of the tow vehicle are purged even when the inverted control pressure input of the trailer control valve is carrying pressure, and hence the wheel brakes of the trailer vehicle are released and the parking brakes of the tow vehicle are applied, whereby the test function can be performed.

To simplify installation in the respective tow vehicle and to avoid installation errors, all valves and other components of the trailer control valve, the backup valve, the parking brake module and the coupling device are preferably combined in a single housing in a trailer control module.

To clarify the invention further, a drawing is attached to the description showing several exemplary embodiments.

DETAILED DESCRIPTION OF THE DRAWINGS

Figure 8:
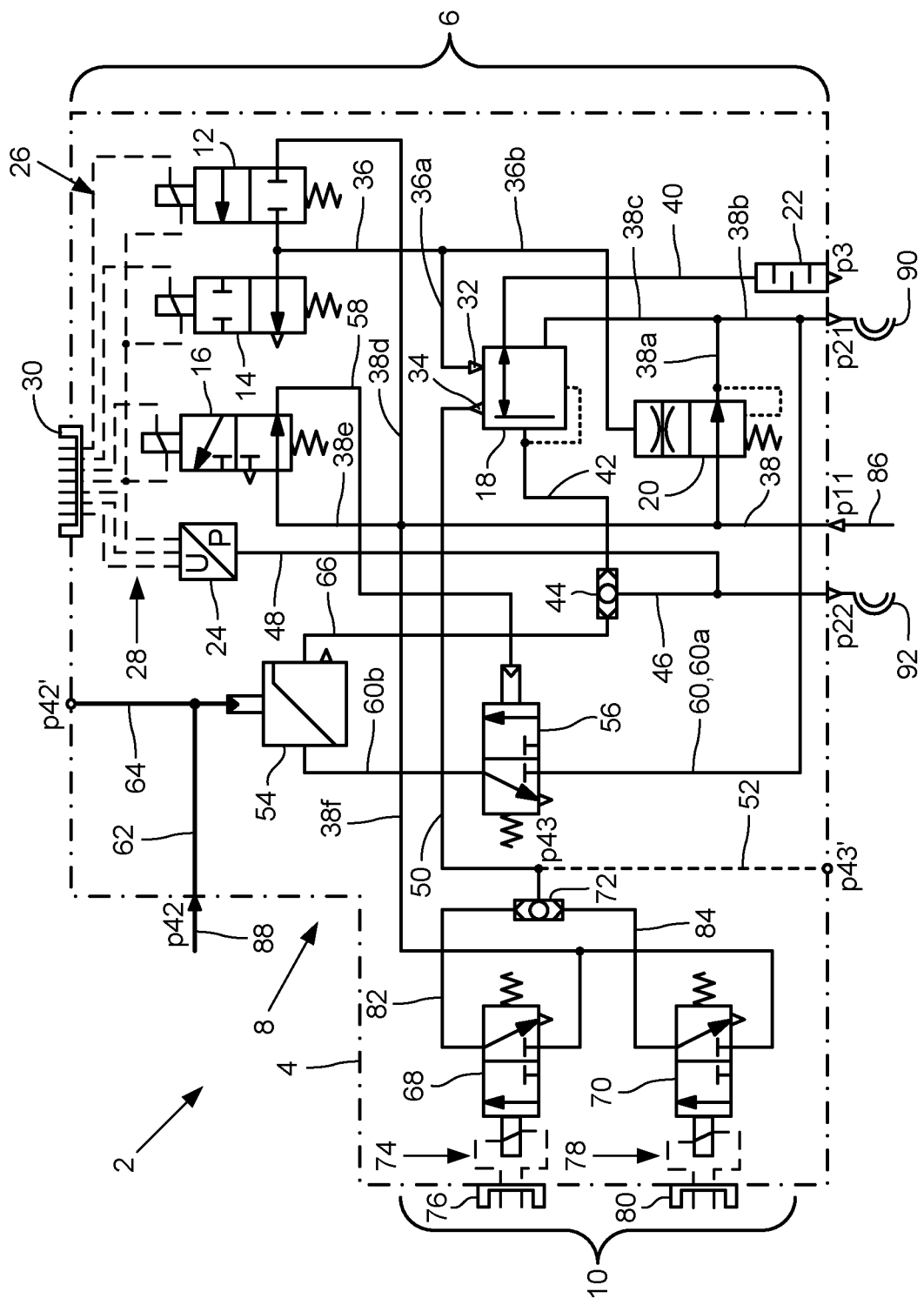
FIG. 8 shows a hydraulic braking system of a tow vehicle with a partially known embodiment of the trailer control module for controlling the brake pressure of a pneumatically braked trailer vehicle in a schematic depiction.

The schematic depiction of FIG. 8 shows a trailer control module 2 of a hydraulically braked tow vehicle for controlling the brake pressure of a pneumatically braked trailer vehicle, using which exemplary embodiments of a valve assembly according to the invention of a tow vehicle with a hydraulic or pneumatic braking system are described below and their function explained. The trailer control valve 6 belonging to the trailer control module 2 shown in FIG. 8.

The trailer control module 2 according to FIG. 8 comprises an electro-pneumatically controlled trailer control valve 6, a hydraulically controlled backup valve 8, and a parking brake module 10 which are arranged in a common housing 4. The trailer control valve 6 has a pneumatically controllable relay valve 18, a pneumatically controllable rapid response valve 20, an inlet valve 12, an outlet valve 14, a pre-control valve 16, a silencer 22 and an electropneumatic pressure sensor 24. The inlet valve 12 and outlet valve 14 are each configured as a 2/2-way magnetic switching valve, in particular a proportional valve, and serve to actuate the relay valve 18. The pre-control valve 16 is configured as a 3/2-way magnetic switching valve and serves to actuate a pressure-controlled redundancy valve 56 of the backup valve 8. The switching magnets of the inlet valve 12, outlet valve 14 and pre-control valve 16 are connected via electrical control lines 26 (not designated individually), and the pressure sensor 24 is connected via electrical sensor lines 28 to a first plug socket 30 arranged on the outer wall of the housing 4. Via this first plug socket 30, in the fitted state of the trailer control module 2, the components are connected via a corresponding plug and cable to an electronic control unit (not shown).

The inlet valve 12 is closed in the non-energized state and open in the energized state. The outlet valve 14 is open in the non-energized state and closed in the energized state. Line branches 36a, 36b of a pressure control line 36, connected to the inlet valve 12 and outlet valve 14, which lead respectively to a direct first control input 32 of the relay valve 18 and to a control pressure input of the rapid response valve 20, can be connected via the inlet valve 12 to a line portion 38d of an internal reservoir pressure line 38, and via the outlet valve 14 to a purge outlet. The reservoir pressure line 38 is connected to a reservoir pressure input p11 of the trailer control module 2. In the fitted state of the trailer control module 2, an external reservoir pressure line 86 of a pneumatic pressure supply system of the tow vehicle is connected to the reservoir pressure input p11. When the drive engine of the tow vehicle is running, a reservoir pressure of around $8.5 \times 10^5$ Pa prevails in this external reservoir pressure line 86.

A line portion 38a branching off the internal reservoir pressure line 38 leads via the rapid response valve 20 and an outlet-side line portion 38b to a reservoir pressure outlet p21 of the trailer control valve 6 or trailer control module 2. A "reservoir" coupling head (red) 90 is connected to the reservoir pressure outlet p21.

A reservoir pressure input of the relay valve 18 of the trailer control valve 6 is connected to the reservoir pressure line 38 via a further line portion 38c and the branching line portion 38a, and via the rapid response valve 20. A purge outlet of the relay valve 18 of the trailer control valve 6 leads via a purge line 40 and the silencer 22 to a purge outlet p3 of the trailer control module 2. A brake control outlet of the relay valve 18 leads via an internal brake control line 42, a first change-over valve 44 and an outlet-side brake control line 46, to a brake pressure outlet p22 of the trailer control module 4. A "brake" coupling head (yellow) 92 is connected to this brake pressure outlet p22. The pressure sensor is connected to the outlet-side brake control line 46 via a sensor pressure line 48.

A further control pressure line 50 is arranged between an inverted control pressure input p43 of the trailer control valve 6 arranged here and an inverted second control pressure input 34 of the relay valve 18 of the trailer control valve 6. Optionally, a connecting line 52 leads from the internal control pressure input p43 to an external pressure connection p43' arranged on an outer wall of the housing 4.

The backup valve 8 comprises a hydraulically actuated relay valve 54 and the redundancy valve 56, which can be actuated by the pre-control valve 16 of the trailer control valve 6. The redundancy valve 56 is configured as a pneumatically controllable 3/2-way switching valve, the control input of which can selectively be loaded with a control pressure taken from the internal reservoir pressure line 38 or switched pressureless via the pre-control valve 16.

In non-energized state of the pre-control valve 16, a control pressure line 58 connected to the control input of the redundancy valve 56 is connected to a line portion 38e branching off the reservoir pressure line 38, and thus carries pressure. In energized state of the pre-control valve 16, the control pressure line 58 is connected to a purge outlet of the pre-control valve 16, and is therefore pressureless.

The redundancy valve 56 is arranged in a reservoir pressure line 60 which leads from the outlet-side line portion 38b of the internal reservoir pressure line 38 to the reservoir pressure input of the relay valve 54. When the control input of the redundancy valve 56 is pressureless, the outlet-side line portion 60b of the above-mentioned reservoir pressure line 60 is connected to a purge outlet at the redundancy valve 56 and is therefore pressureless. When the control input of the redundancy valve 56 carries pressure, the outlet-side line portion 60b is connected to the input-side line portion 60a of the reservoir pressure line 60, and hence under reservoir pressure.

A hydraulic control pressure line 88, which branches off a hydraulic brake line of the tow vehicle, leads to a hydraulic brake pressure input p42 of the backup valve 8, from which an internal hydraulic control pressure line 62 leads to a control pressure input of the relay valve 54. From this internal hydraulic control pressure line 62, a connecting line 64 also leads to a brake pressure connection p42' arranged on an outer wall of the housing 4, to which optionally an electrohydraulic pressure sensor may be connected.

When the reservoir pressure input carries pressure, depending on the brake pressure present at the brake pressure input p42, the relay valve 54 outputs a brake control pressure conducted via a brake control line 66 to the first change-over valve 44. This first change-over valve 44 conducts the respective higher brake control pressure from the brake control line 42 of the trailer control valve 6, or from the brake control line 66 of the backup valve 8, to the brake control outlet p22 and on to the "brake" coupling head 92.

In normal operation of the trailer control module 2, the trailer control valve 6 is activated in that it is actuated by the assigned electronic control unit. In the presence of a brake value signal, which may be detected via a brake sensor arranged in a foot brake valve of the tow vehicle, by corresponding actuation of the inlet valve 12 and outlet valve 14 of the trailer control valve 6, a control pressure may be set at the direct control input 32 of the relay valve 18. Depending on this, the relay valve 18 outputs a corresponding brake control pressure, which is conducted via the brake control line 42, the first change-over valve 44 and the internal brake control line 46 to the brake control outlet p22 and to the "brake" coupling head (yellow) 92. With a coupled trailer vehicle, the reservoir pressure present at the "reservoir" coupling head 90 and the brake control pressure present at the "brake" coupling head 92 are conducted further to the trailer brake valve of the trailer vehicle, in which the applicable brake pressure is set for the wheel brakes of the trailer vehicle and conducted via brake lines to the wheel brake cylinders there.

The pre-control valve 16 controlling the redundancy valve 56 is energized in normal operation of the trailer control module 2, so that the control input of the redundancy valve 56 is then purged and hence pressureless. Thus the outlet-side line portion 60b of the reservoir pressure line 60 is purged, whereby the relay valve 54 of the backup valve 8 is deactivated.

On a failure of the electronic control unit or in the absence of an electronic brake value signal, the power to the inlet valve 12 and outlet valve 14 of the trailer control valve 6 is lost, whereby the inlet valve 12 is permanently closed and the outlet valve 14 is permanently opened, and accordingly the trailer control valve 6 is deactivated. At the same time, in the operating situation outlined, the control input of the redundancy valve 56 of the backup valve 8 is loaded with the reservoir pressure from the internal reservoir pressure line 38 via the control pressure line 58, due to the disconnection of the pre-control valve 16, and the redundancy valve 56 is thereby switched. The resulting loading of the reservoir pressure input of the relay valve 54 with the reservoir pressure from the reservoir pressure line 60 activates the backup valve 8. As a result now, in the hydraulically actuated relay valve 54, depending on the brake pressure active in the hydraulic control pressure line 62, a corresponding brake control pressure is set and conducted via the brake control line 66, the first change-over valve 44 and the brake control line 46, to the brake control outlet p22 and the "brake" coupling head (yellow) 92. In the present redundancy case, with a coupled trailer vehicle, thus in the trailer brake valve of the trailer vehicle, a brake pressure for the wheel brakes of the trailer vehicle is set which corresponds to the brake control pressure set via the relay valve 54 of the backup valve 8, and conducted to the wheel brake cylinders there via the brake lines.

The parking brake module 10 serves for actuating the relay valve 18 of the trailer control valve 6 at its inverted control input 34, in order to operate the wheel brakes of a coupled trailer vehicle in a parking brake function.

The parking brake module 10 comprises two parallel-connected parking brake valves 68, 70 and a second change-over valve 72 downstream thereof on the outlet side. This second change-over valve 72 is connected on the outlet side, via the internal control pressure input p43, to the above-mentioned control pressure line 50 which leads to the inverted control input 34 of the relay valve 18. The two parking brake valves 68, 70 are configured as 3/2-way magnetic switching valves, the switching magnets of which are electrically connected via electrical control lines 74, 78 to a respective second or third plug socket 76, 80 arranged in the outer wall of the housing 4. In the fitted state of the trailer control module 2, the switching magnets of the parking brake valves 68, 70 are each connected via a cable with corresponding plug to an electronic control unit of the parking brake module 10, which has separate switching units for independent switch actuation of the parking brake valves 68, 70. The switching units of the electronic control device are configured such that the respective switching state of the parking brake valves 68, 70 is maintained by default and can only be changed actively. The cables and the electronic control unit are not shown in FIG. 1 but are generally known to the person skilled in the art.

Via the two parking brake valves 68, 70, a respective brake control line 82, 84 connected to one of the inputs of the second change-over valve 72 may be connected selectively to a branch of a line portion 38f branching off the internal reservoir pressure line 38 or to a purge outlet. The second change-over valve 72 conducts the respective higher brake control pressure from the brake control line 82 of the first parking brake valves 68, or from the brake control line 84 of the second parking brake valve 70, to the internal control pressure input p43 and hence to the inverted control input 34 of the relay valve 18. In non-energized state of the two parking brake valves 68, 70, the brake control lines 82, 84 and hence also the inverted control input 34 of the relay valve 18 are switched to be pressureless, as shown in FIG. 8. Thus a maximum brake control pressure is output from the relay valve 18 of the trailer control valve 6 and conducted via the brake control line 42, the first change-over valve 44 and the brake control line 46, to the brake control outlet p22 and the "brake" coupling head (yellow) 92. Accordingly, with a coupled trailer vehicle, its wheel brake cylinders are loaded with a maximum braking pressure via the trailer brake valve, and the wheel brakes are applied via the parking brake function.

On operation, i.e. switching of one of the two parking brake valves 68, 70, the respective brake control line, i.e. the brake control line 82 or the brake control line 84, and hence the inverted control input 34 of the relay valve 18, is loaded with the reservoir pressure from the line portion 38f of the internal reservoir pressure line 38. Thus with a coupled trailer vehicle, its wheel brake cylinders are purged via the trailer brake valve there, whereby the wheel brakes there are released via the parking brake function. In driving operation of the tow vehicle, the parking brakes 68, 70 are accordingly energized and thus switched, so that the wheel brakes of a coupled trailer vehicle are released via the parking brake function.

The trailer control modules 94, 94'; 100, 100'; 106, 106' described below are each extended in comparison with the parking brake module 2 from FIG. 8 by a coupling device 98, 98'; 104, 104'; 110, 110'. By means of these coupling devices 98, 98'; 104, 104'; 110, 110', in addition the parking brakes of the tow vehicle may be operated via the parking brake valves 68, 70 of the parking brake module 10.

Figure 1:
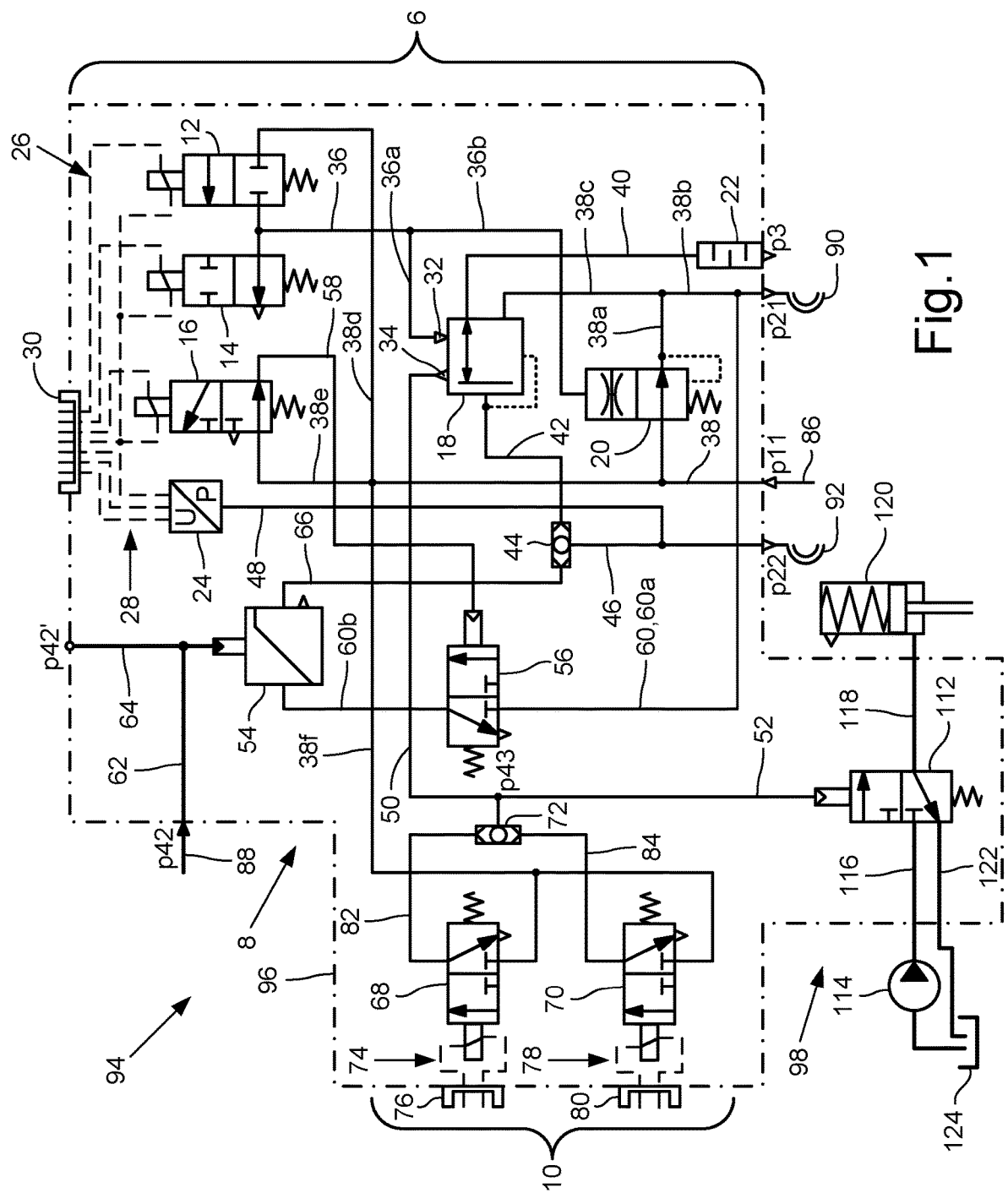
FIG. 1 shows a hydraulic braking system of a tow vehicle with a trailer control module according to the invention in a schematic depiction.
Figure 2:
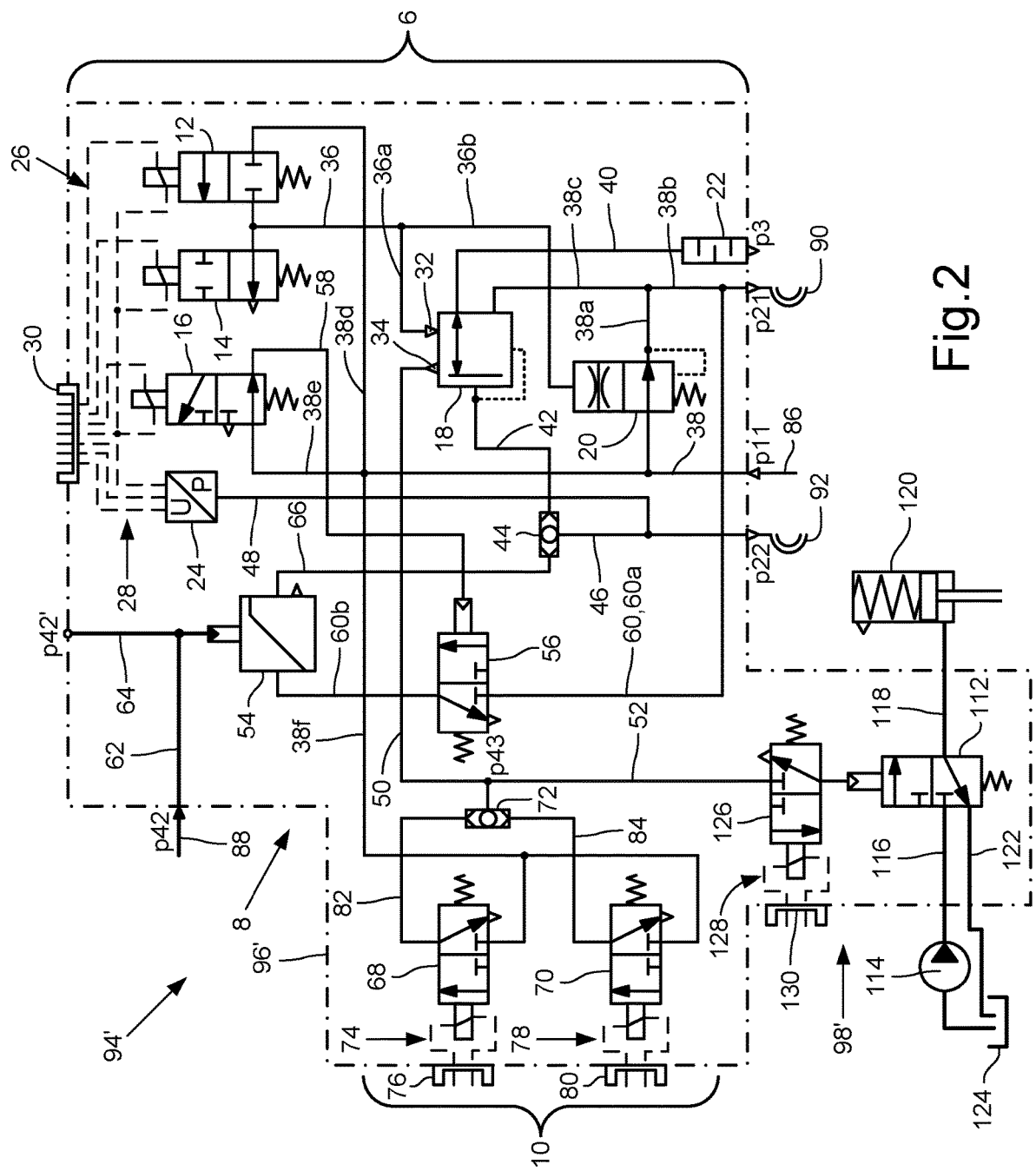
FIG. 2 shows the hydraulic braking system of the tow vehicle from FIG. 1 with a refinement of the trailer control module in a schematic depiction.
Figure 3:
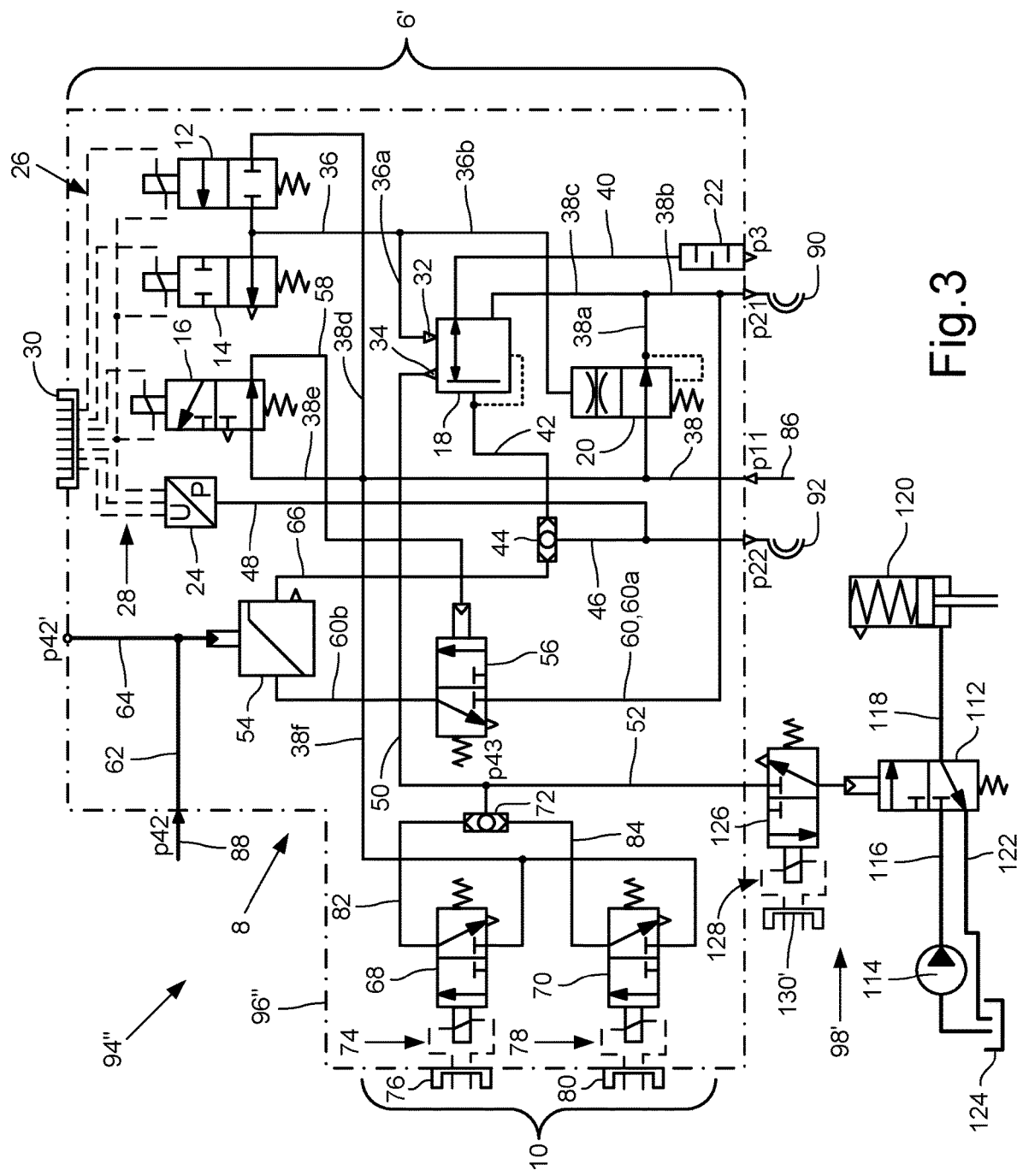
FIG. 3 shows the hydraulic braking system of the tow vehicle according to FIG. 1 with a trailer control module similar to that of FIG. 2 but with a smaller number of valves in the trailer control valve there.

In the trailer control modules 94, 94', 94" shown in FIGS. 1 to 3, like the trailer control module 2 in FIG. 8, a hydraulic braking system of the tow vehicle is assumed.

In contrast, in the trailer control modules 100, 100'; 106, 106' shown in FIGS. 4 to 7, a pneumatic braking system of the tow vehicle is assumed. Therefore in these trailer control valves 100, 100'; 106, 106', the respective relay valve 54' of the backup valve 8' is shown as pneumatically actuatable. Therefore in these trailer control modules 100, 100'; 106, 106' according to FIGS. 4 to 7, it is provided that from a pneumatic brake pressure connection p41 of the backup valve 8', to which a pneumatic control pressure line 88' branching off a pneumatic brake line of the tow vehicle is connected, an internal pneumatic control pressure line 62' leads to a control pressure input of the relay valve 54'. From this control pressure line 62', a connecting line 64' also leads to a brake pressure connection p41', which is arranged on an outer wall of the respective housing 102, 102'; 108, 108' and to which optionally an electropneumatic pressure sensor may be connected. The function of the relay valve 54' in FIGS. 4 to 7 corresponds in principle to the function of the hydraulically actuatable relay valve 54 described above according to FIG. 8.

The coupling device 98 of the trailer control module 94 shown in FIG. 1 comprises a pneumatically controllable coupling valve 112 with a pneumatic control input, which is connected to the outlet of the second change-over valve 72 via the connecting line 52. Via the coupling valve 112, the parking brake cylinders 120 of the tow vehicle may be connected selectively to a pressure medium source 114 or to a pressure medium sink 124. The parking brake cylinders 120 are configured as hydraulically actuatable spring accumulator brake cylinders, and in the present case, for simpler depiction, are represented by a single parking brake cylinder 120.

The coupling valve 112 is configured as a pneumatically pressure-controlled 3/2-way switching valve, the control input of which is connected via the connecting line 52 to the outlet of the second change-over valve 72 of the parking brake module 10 and the control pressure line 50 leading to the relay valve 18. A brake line 118, leading to the parking brake cylinders 120 of the tow vehicle, is connected to an outlet of the coupling valve 112. When the coupling valve 112 is not carrying control pressure, the brake line 118 is connected to a pressureless return line 122 leading to a collection tank 124, whereby the parking brakes of the tow vehicle are actuated, i.e. applied, by the air-filling of the parking brake cylinders 120. When the coupling valve 112 is carrying control pressure, the brake line 118 is connected to a hydraulic supply line 116 connected to an oil pump 114, whereby the parking brakes of the tow vehicle are released by pressurization of the parking brake cylinders 120.

Since the parking brake cylinders 120 of the tow vehicle are air-filled or pressureless when the coupling valve 112 is not carrying control pressure, i.e. also when the inverted control input 34 of the relay valve 18 is purged, the parking brakes of the tow vehicle and the wheel brakes of a coupled trailer vehicle are applied in synchrony via the parking brake function. Similarly, the parking brakes of the tow vehicle and the wheel brakes of a coupled trailer vehicle are released in synchrony via the parking brake function, because the parking brake cylinders 120 of the tow vehicle are loaded with the hydraulic supply pressure and hence released when the coupling valve 112 is carrying control pressure, i.e. if also the inverted control input 34 of the relay valve 18 is filled with the reservoir pressure.

The function scope of the trailer control module 94 is thus extended in comparison with the function scope of the trailer control module 2 according to FIG. 8, to include operation of the parking brakes of the tow vehicle, with relatively little additional equipment. The valves (12, 14, 16, 18, 20, 44, 54, 56, 68, 70, 72, 112) and the other components (22, 24) of the trailer control valve 6, backup valve 8, parking brake module 10 and coupling device 98 are combined in a single housing 96 in the trailer control module 94, whereby installation in the respective tow vehicle is simplified and installation errors are avoided.

FIG. 2 shows a refinement of the trailer control module 94 according to FIG. 1. In this trailer control module 94', the coupling device 98' additionally comprises a test valve 126, via which the pneumatic control input of the coupling valve 112 can be selectively connected to the outlet of the second change-over valve 72 or purged. The test valve 126 is configured as a 3/2-way magnetic switching valve with one outlet and arranged in the above-mentioned connecting line 52. The outlet of the test valve 126 is connected to the control input of the coupling valve 112, and is connected in non-energized state to a purge outlet, and in energized state to the outlet of the second change-over valve 72. The switching magnet of the test valve 126 is electrically connected via electrical control lines 128 to a plug socket 130 arranged in the outer wall of the housing 96'. In the fitted state of the trailer control module 94', the switching magnet of the test valve 126 is connected via a cable with a suitable plug to the electronic control unit of the parking brake module 10.

The test valve 126 serves to perform a test function specified in the relevant licensing regulations. The test function informs a driver whether, on parking a vehicle train, the parking brakes of the tow vehicle are sufficient to safely hold the vehicle train in the parked position. For this, by simultaneous switching of the two parking brakes 68, 70 and the test valve 126, the wheel brakes of the trailer vehicle are released via the parking brake function by air-filling of the inverted control input 34 of the relay valve 18, and at the same time the parking brakes of the tow vehicle are applied by purging of the control input of the test valve 112. If the vehicle train then rolls further, the driver must seek a parking position with a smaller gradient or secure the vehicle train against rolling with wheel chocks.

The test valve 126 is structurally combined with the other valves (12, 14, 16, 18, 20, 44, 54, 56, 68, 70, 72, 112) and the other components (22, 24) of the trailer control valve 6, backup valve 8, parking brake module 10 and coupling device 98' in a single housing 96' in the trailer control module 94'.

FIG. 3 shows a variant of the trailer control module 94' shown in FIG. 2. With otherwise identical structure, in this trailer control module 94", the coupling valve 112, the test valve 126 and the control lines 128 assigned to the test valve 126, and the plug socket 130', are not part of the trailer control valve 6'. In other words, the structural elements of the coupling device 98' are not situated within the system limits of the trailer control valve 6' and not inside its housing 96". Thus the trailer control valve 6' is structurally simpler and smaller in comparison with the trailer control valve 6 according to FIG. 2. This construction may be also implemented with the trailer control valve 6 according to FIG. 5. The control lines 128 for actuating the test valve 126, 126' are then conducted to a plug socket 130' attached to another housing (not shown).

Figure 4:
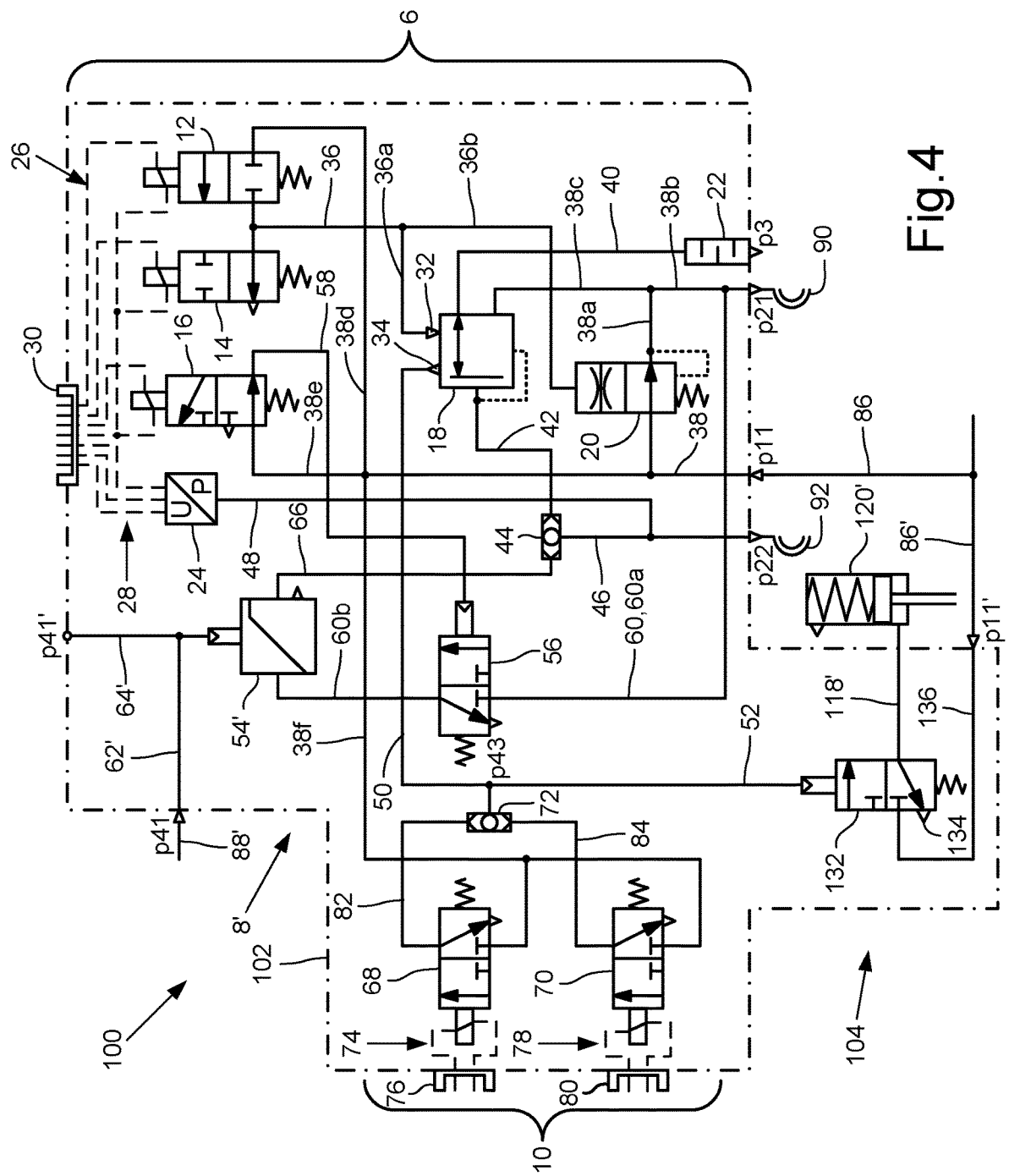
FIG. 4 shows a pneumatic braking system of a tow vehicle with a first embodiment of a trailer control module according to the invention in a schematic depiction.

The coupling device 104 of the trailer control module 100 shown in FIG. 4, like the trailer control module 94 in FIG. 1, comprises a pneumatically controllable coupling valve 132 with a control input, which is connected via the connecting line 52 to the outlet of the second change-over valve 72. Via the coupling valve 132, the parking brake cylinders 120' of the tow vehicle may be connected selectively to the pressure medium source 86' or to a pressure medium sink. The pressure medium source is symbolized in FIG. 4 by a reservoir pressure line 86' instead of an oil pump 114. The parking brake cylinders 120' are now configured as pneumatically actuatable spring accumulator brake cylinders, and in the present case, for simpler depiction, are represented by a single parking brake cylinder 120'.

The coupling valve 132 is configured as a pneumatic pressure-controlled 3/2-way switching valve, the control input of which is connected via the pneumatic connecting line 52 to the outlet of the second change-over valve 72 of the parking brake module 10 and to the control pressure line 50 of the relay valve 18. A brake line 118' leading to the parking brake cylinders 120' of the tow vehicle is connected to an outlet of the coupling valve 132. When the coupling valve 132 is not carrying control pressure, the brake line 118' is connected to a purge outlet 134 leading to the environment, whereby the parking brakes of the tow vehicle are actuated, i.e. applied, by the air-filling of the parking brake cylinders 120'. When the coupling valve 132 is carrying control pressure, the brake line 118' is connected via a connecting line 136, which leads to a reservoir pressure input p11', to a pneumatic reservoir line 86' connected to a compressed air supply system, whereby the parking brakes of the tow vehicle are released by pressurization of the parking brake cylinders 120'.

Since the parking brake cylinders 120' of the tow vehicle are purged or pressureless when the coupling valve 132 is not carrying control pressure, i.e. when the inverted control input 34 of the relay valve 18 is purged, the parking brakes of the tow vehicle and the wheel brakes of a coupled trailer vehicle are applied in synchrony via the parking brake function. Similarly, the parking brakes of the tow vehicle and the wheel brakes of a coupled trailer vehicle are released in synchrony via the parking brake function, because the parking brake cylinders 120' of the tow vehicle are filled with reservoir pressure and hence released when the coupling valve 132 is carrying control pressure, i.e. if also the inverted control input 34 of the relay valve 18 is filled with reservoir pressure.

In the trailer control module 100 shown in FIG. 4, the function scope has also been extended in comparison with the function scope of the trailer control module 2 according to FIG. 8 to include operation of the parking brakes of the tow vehicle, with relatively little additional equipment. The valves (12, 14, 16, 18, 20, 44, 54', 56, 68, 70, 72, 132) and the other components (22, 24) of the trailer control valve 6, backup valve 8, parking brake module 10 and coupling device 104 are combined in a single housing 102 in the trailer control module 100, whereby installation in the respective tow vehicle is simplified and installation errors are avoided.

Figure 5:
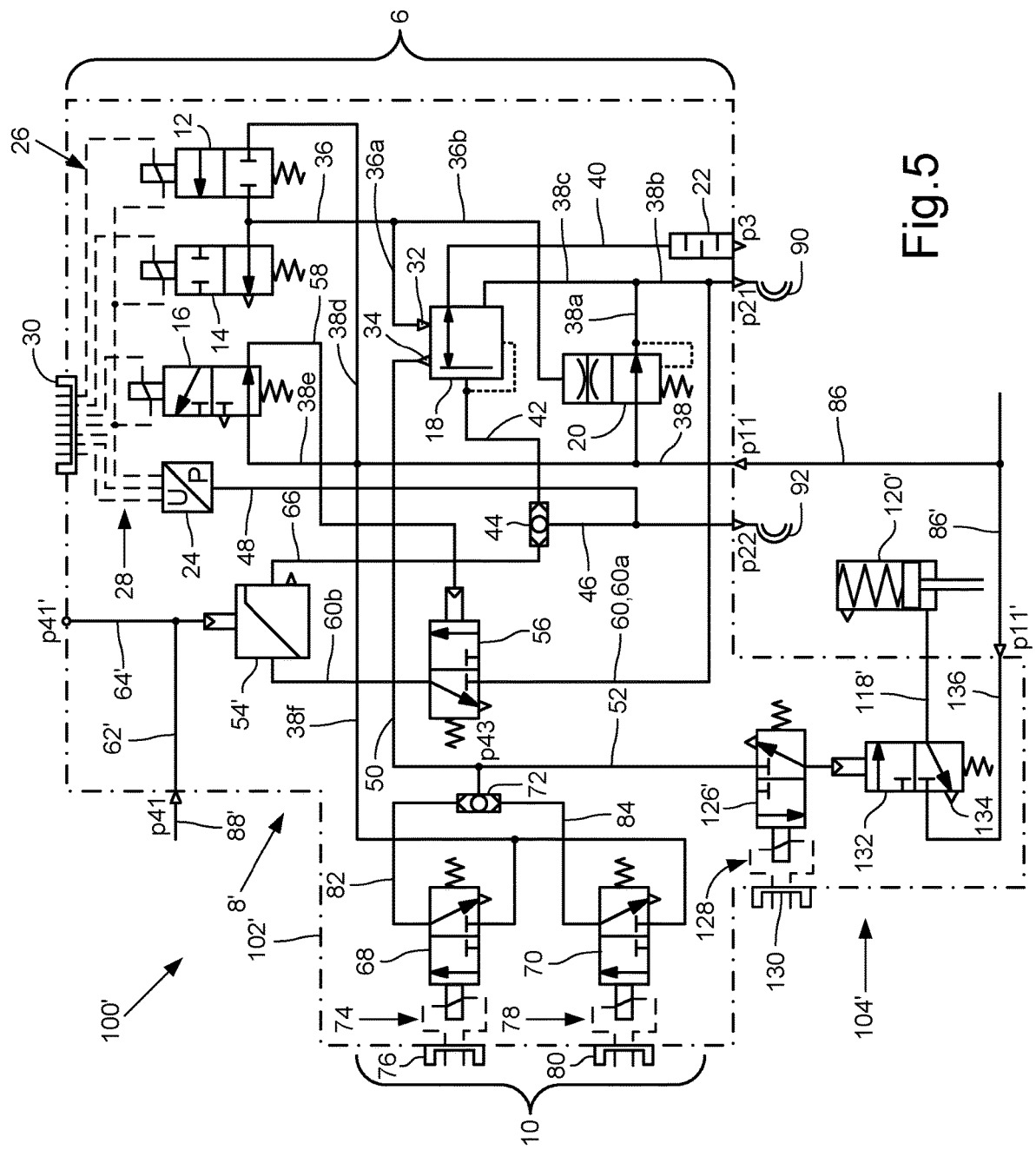
FIG. 5 shows the pneumatic braking system of the tow vehicle from FIG. 3 with a refinement of the trailer control module in a schematic depiction.

FIG. 5 shows a refinement of the trailer control module 100 according to FIG. 4. In this trailer control module 100', the coupling device 104', like the coupling device 98' of the trailer control module 94' in FIG. 2, also has a test valve 126' via which the control input of the coupling valve 132 may selectively be connected to the outlet of the second change-over valve 72 or purged. The test valve 126' is configured as a 3/2-way magnetic switching valve with one outlet and arranged in the above-mentioned connecting line 52. The outlet of the test valve 126' is connected to the control input of the coupling valve 132, and connected in non-energized state to a purge outlet and in energized state to the outlet of the second change-over valve 72. The switching magnet of the test valve 126' is connected via electrical control lines 128 to a plug socket 130 arranged in the outer wall of the housing 102'. In the fitted state of the trailer control module 100', the switching magnet of the test valve 126' is connected via a cable with a corresponding plug to the electronic control unit of the parking brake module 10.

The test valve 126', as described above, serves to perform a test function via which a driver can check whether, on parking a vehicle train, the parking brakes of the tow vehicle are sufficient to safely hold the vehicle train in the parked position. The test valve 126' is structurally combined with the other valves (12, 14, 16, 18, 20, 44, 54', 56, 68, 70, 72, 126', 132) and the other components (22, 24) of the trailer control valve 6, backup valve 8, parking brake module 10 and coupling device 104' in a single housing 102' in the trailer control module 100'.

Figure 6:
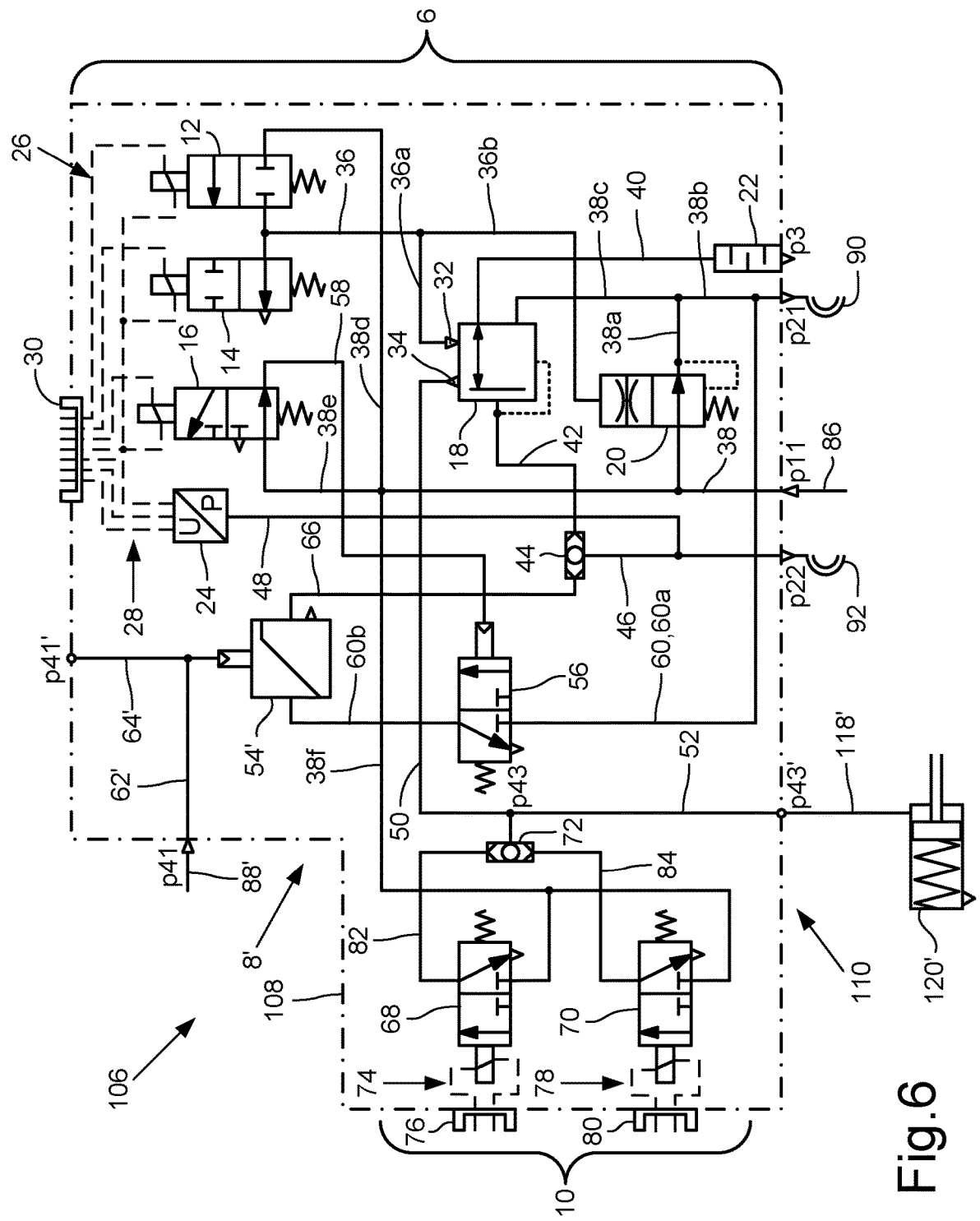
FIG. 6 shows a pneumatic braking system of a tow vehicle with a second embodiment of a trailer control module according to the invention in a schematic depiction.

The coupling device 110 in the trailer control module 106 shown in FIG. 6 is designed as an alternative to the coupling device 104 of the trailer control module 100 shown in FIG. 4, and comprises only the above-mentioned connecting line 52, via which a brake line 118 leading to the parking brake cylinders 120' of the tow vehicle is connected to the outlet of the second change-over valve 72. In this embodiment of the coupling device 110, the parking brake cylinders 120' of the tow vehicle, designed as spring accumulator brake cylinders, are air-filled and purged directly via the two parking brake valves 68, 70 of the parking brake module 10. Therefore, the parking brake valves 68, 70 and the second change-over valve 72 have correspondingly large opening cross-sections, and the brake control lines 82, 84 and the connecting line 52 have correspondingly large cross-sections, in order to be able to handle, largely without choking, the correspondingly larger volume flow of the compressed air flowing into or out of the parking brake cylinders.

In unactuated, i.e. non-energized, state of the two parking brake valves 68, 70, the inverted control input 34 of the relay valve 18 is switched to be pressureless and the parking brake cylinders 120' of the tow vehicle are purged, so that both the wheel brakes of the trailer vehicle and the parking brakes of the tow vehicle are applied via the parking brake function. On actuation, i.e. switching, of one of the two parking brake valves 68, 70, the inverted control input 34 of the relay valve 18 is loaded with reservoir pressure and the parking brake cylinders 120' of the tow vehicle are air-filled, which leads to release of the wheel brakes of the trailer vehicle via the parking brake function and release of the parking brakes of the trailer vehicle.

The function scope of the trailer control module 106 thus corresponds to that of the trailer control module 100 according to FIG. 4. Because of the omission of the coupling valve 132, the coupling device 110 of the trailer control valve 106 has however a significantly simpler structure. The valves (12, 14, 16, 18, 20, 44, 54', 56, 68, 70, 72) and the other components (22, 24) of the trailer control valve 6, backup valve 8, parking brake module 10 and coupling device 110 are combined in a single housing 108 in the trailer control module 106, whereby installation in the respective tow vehicle is simplified and installation errors are avoided.

Figure 7:
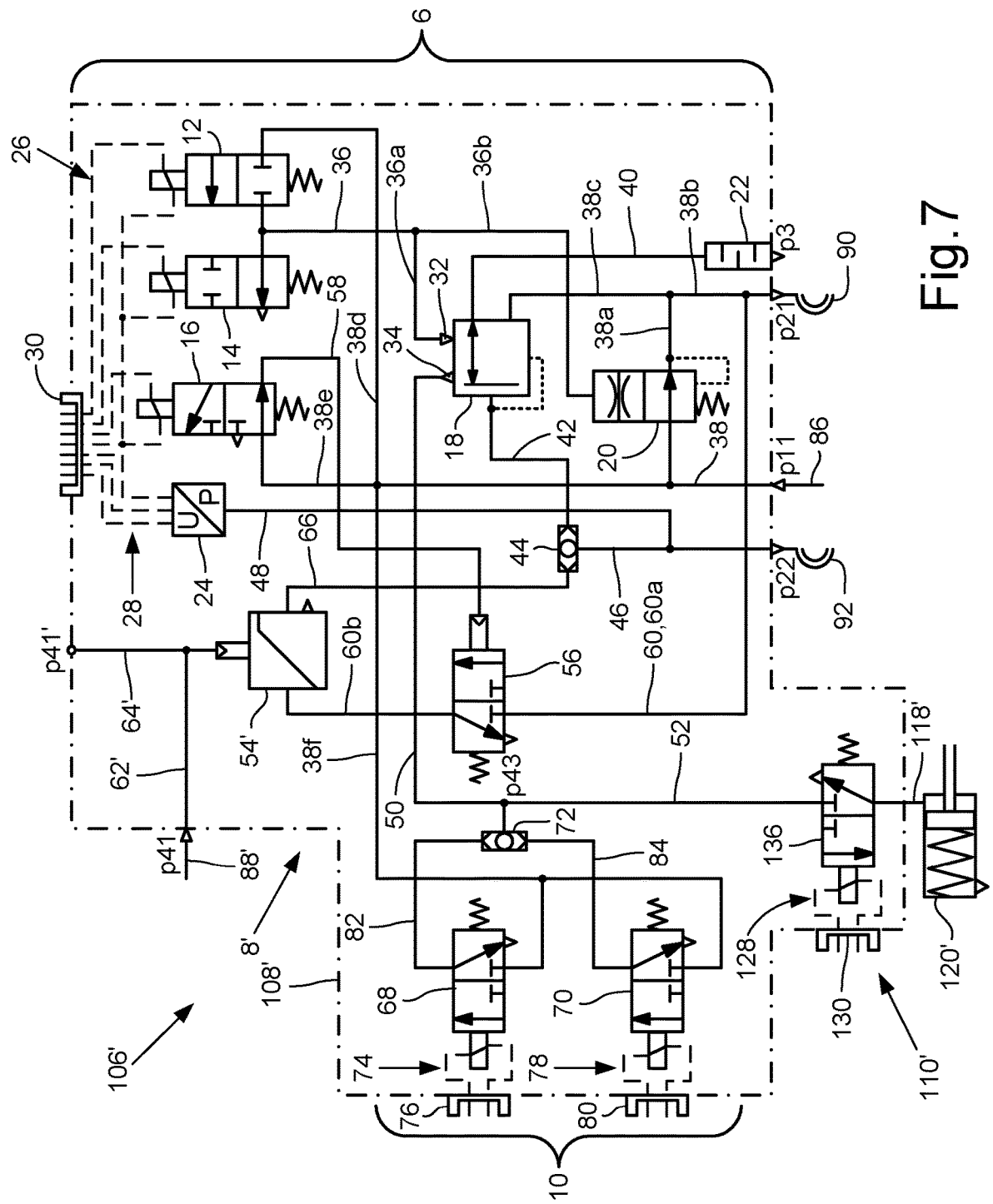
FIG. 7 shows the pneumatic braking system of the tow vehicle from FIG. 5 with a refinement of the trailer control module in a schematic depiction.

FIG. 7 shows a refinement of the trailer control module 106 according to FIG. 6. In this trailer control module 106', the coupling device 110', like the coupling devices 98', 104' of the two trailer control modules 94', 100' already described, according to FIGS. 2 and 5, also has a test valve 136 with a larger opening cross-section, via which the brake line 118' may selectively be connected to the outlet of the second change-over valve 72 or purged. The test valve 136 is configured as a 3/2-way magnetic switching valve with one outlet and arranged between the above-mentioned connecting line 52 and the brake line 118'. The outlet of the test valve 136 is connected to the brake line 118' and is connected in non-energized state to a purge outlet and in energized state to the connecting line 52. The switching magnet of the test valve 136 is connected via electrical control lines 128 to a plug socket 130 arranged on an outer wall of the housing 108'. In the fitted state of the trailer control module 106', the switching magnet of the test valve 136 is connected via a cable fitted with a corresponding plug to the electronic control unit of the parking brake module 10.

The test valve 136 according to FIG. 7, as described above, serves to perform a test function, via which a driver can check whether, on parking a vehicle train, the parking brakes of the tow vehicles are sufficient to safely hold the vehicle train in the parked position. The test valve 136 is combined with the other valves (12, 14, 16, 18, 20, 44, 54', 56, 68, 70, 72) and the other components (22, 24) of the trailer control valve 6, backup valve 8', parking brake module 10 and coupling device 110' in a single housing 108' in the trailer control module 106'.

LIST OF REFERENCE CHARACTERS

2 Trailer control module
4 Housing
6 Trailer control valve (with larger integration scope)
6' Trailer control valve (with smaller integration scope)
8 Backup valve
10 Parking brake module
12 Inlet valve, 2/2-way magnetic valve
14 Outlet valve, 2/2-way magnetic valve
16 Pre-control valve, 3/2-way magnetic valve
18 First relay valve
20 Rapid response valve
22 Silencer
24 Pressure sensor
26 Control lines
28 Sensor lines
30 First plug socket (on trailer control valve 6)
32 Direct control input on relay valve 18
34 Inverted control input on relay valve 18
36 Control pressure line
36a, 36b Line branches
38 Reservoir pressure line
38a-38f Line portions
40 Purge line
42 Brake control line
44 First change-over valve
46 Brake control line
48 Sensor pressure line
50 Control pressure line
52 Connecting line
54, 54' Second relay valve
56 Redundancy valve
58 Control pressure line
60 Reservoir pressure line
60a, 60b Line portions
62, 62' Control pressure line
64, 64' Connecting line
66 Brake control line
68 First parking brake valve
70 Second parking brake valve
72 Second change-over valve
74 Control lines
76 Second plug socket (on trailer control valve 6)
78 Control lines
80 Third plug socket (on trailer control valve 6)
82 Brake control line
84 Brake control line
86 Reservoir pressure line at p11, pressure-medium source
86' Reservoir pressure line at p11', pressure-medium source
88 Hydraulic control pressure line of tow vehicle at p42
88' Pneumatic control pressure line of tow vehicle at p41
90 "Reservoir" coupling head (red)
92 "Brake" coupling head (yellow)
94 Trailer control module (first variant)
94' Trailer control module (second variant)
94" Trailer control module (third variant)
96 Housing of trailer control module 94
96' Housing of trailer control module 94'
96" Housing of trailer control module 94"
98 Coupling device (first variant)
98' Coupling device (second variant)
100 Trailer control module (fourth variant)
100' Trailer control module (fifth variant)
102 Housing of trailer control module 100
102' Housing of trailer control module 100'
104 Coupling device (third variant)
104' Coupling device (fourth variant)
106 Trailer control module (sixth variant)

106' Trailer control module (seventh variant)
108 Housing of trailer control module 106
108' Housing of trailer control module 106'
110 Coupling device (fifth variant)
110' Coupling device (sixth variant)
112 Coupling valve, 3/2-way switching valve
114 Pressure-medium source, oil pump
116 Supply line
118 Brake line (first variant)
118' Brake line (second variant)
120 Parking brake cylinder (first variant)
120' Parking brake cylinder (second variant)
122 Return line
124 Pressure-medium sink; collection tank
126 Test valve, 3/2-way magnetic switching valve, (first variant)
126' Test valve, 3/2-way magnetic switching valve, (second variant)
128 Control lines
130 Fourth plug socket (on trailer control valve 6)
130' Fifth plug socket (not on trailer control valve 6')
132 Coupling valve, 3/2-way switching valve
134 Pressure-medium sink, purge outlet
136 Test valve, 3/2-way magnetic switching valve, (third variant)
p3 Purge outlet
p11 First reservoir pressure input
p11' Second reservoir pressure input
p21 Reservoir pressure outlet
p22 Brake control outlet
p41 Pneumatic brake pressure input
p41' Pneumatic brake pressure connection
p42 Hydraulic brake pressure input
p42' Hydraulic brake pressure connection
p43 Control pressure input
p43' External pressure connection

The invention claimed is:

1. A trailer control module (94, 94', 94", 100, 100', 106, 106') of a pressure-medium operated braking system of a tow vehicle, the trailer control module comprising:
with a valve assembly for controlling a pneumatic braking system of a trailer vehicle, wherein the valve assembly comprises the following:
an electronically controlled trailer control valve (6, 6') including a pneumatically controlled relay valve (18) with an inverted control input (34),
a pressure-medium controlled backup valve (8, 8') including a pressure-medium controlled relay valve (54, 54'),
at least one electronically controlled parking brake valve (68, 70), configured to pneumatically actuate the pneumatically controlled relay valve (18) of the trailer control valve (6) at the inverted control input (34), and
a coupling device (98, 98'; 104, 104'; 110, 110') configured to operate parking brakes of the tow vehicle via the parking brake valve (68, 70).

2. The trailer control module (94, 94', 94", 100, 100') as claimed in claim 1,
wherein the coupling device (98, 98'; 104, 104') comprises a pneumatically controllable coupling valve (112, 132) with a control input connected via a connecting line (52) to an outlet of the parking brake valve (68, 70) or to an outlet of a change-over valve (72) downstream of the outlet of the parking brake valve (68, 70), and
wherein parking brake cylinders (120, 120') of the tow vehicle are configured to be selectively connected via the coupling valve (112, 132) to a pressure-medium source (114, 86') or to a pressure-medium sink (124, 134).

3. The trailer control module (94, 94', 94", 100, 100') as claimed in claim 2,
wherein the coupling valve (112, 132) is configured as a pneumatically pressure-controlled 3/2-way switching valve with one outlet,
wherein a brake line (118, 118') leading to the parking brake cylinders (120, 120') of the tow vehicle is connected to the outlet of the coupling valve (112, 132), and
wherein the brake line (118, 118') has an inlet that is connected, when the coupling valve (112, 132) is not under control pressure, to the pressure-medium sink (124, 134) and, when the coupling valve (112, 132) is carrying control pressure, to the pressure-medium source (114, 86').

4. The trailer control module (94, 94', 94",) as claimed in claim 2
wherein the trailer control module is configured to cooperate with a hydraulic braking system of the tow vehicle and is configured to selectively connect the parking brake cylinders (120) of the tow vehicle via the coupling valve (112) to a hydraulic supply line (116) connected to an oil pump (114), or to a pressureless return line (122) leading to a collection tank (124).

5. The trailer control module (100, 100') as claimed in claim 2,
wherein the trailer control module is configured to cooperate with a pneumatic braking system of the tow vehicle and is configured to selectively connect the parking brake cylinders (120') of the tow vehicle via the coupling valve (132) to a pneumatic reservoir line (86') connected to a compressed air supply system, or to a purge outlet (134) leading to the environment.

6. The trailer control module (94', 94", 100') as claimed in claim 1,
wherein the coupling device (98', 104') also has a test valve (126, 126') configured to selectively connect the control input of the coupling valve (112, 132) to the outlet of the parking brake valve (68, 70), to the outlet of the change-over valve (72), or to atmosphere.

7. The trailer control module (94', 94", 100') as claimed in claim 6,
wherein the test valve (126, 126') is configured as a 3/2-way magnetic switching valve with one outlet,
wherein the test valve (126, 126') is connected to a connecting line (52) leading from the outlet of the parking brake valve (68, 70) or the outlet of the change-over valve (72) to the control input of the coupling valve (112, 132),
wherein the outlet of the test valve (126, 126') is connected to the control input of the coupling valve (112, 132),
wherein the outlet of the test valve (126, 126') in a non-energized state is connected to a purge outlet, and
wherein the outlet of the test valve (126, 126') in an energized state is connected to the outlet of the parking brake valve (68, 70) or to the outlet of the downstream change-over valve (72).

8. The trailer control module (106, 106') as claimed in claim 1,
wherein with a pneumatic braking system of the tow vehicle, the coupling device (110, 110') has a connecting line (52), via which a brake line (118') leading to the parking brake cylinders (120') of the tow vehicle can be connected to the outlet of the parking brake valve (68, 70) or to the outlet of a change-over valve (72) downstream thereof.

9. The trailer control module (106, 106') as claimed in claim 8,
   wherein the coupling device (110') further has a test valve (136), configured to selectively connect the brake line (118') of the tow vehicle to the outlet of the parking brake valve (68, 70), to the outlet of the change-over valve (72), or to atmosphere.

10. The trailer control module (106, 106') as claimed in claim 9,
    wherein the test valve (136) is a 3/2-way magnetic switching valve with one outlet and is arranged between the connecting line (52) and the brake line (118') of the tow vehicle,
    wherein the outlet of the test valve (136) connected to the brake line (118') of the tow vehicle, in a non-energized state, is connected to a purge outlet, and
    wherein the outlet of the test valve (136), in an energized state, is connected to the connecting line (52).

11. The trailer control module (94, 94', 100, 100', 106, 106') as claimed in claim 1,
    wherein the trailer control valve (6), the backup valve (8, 8'), a parking brake module (10) and the coupling device (98, 98'; 104, 104'; 110, 110') of the trailer control module (94, 94'; 100, 100'; 106, 106') are combined in a single housing (96, 96'; 102, 102'; 108, 108').

* * * * *